United States Patent [19]

Beasley et al.

[11] Patent Number: 5,699,275
[45] Date of Patent: Dec. 16, 1997

[54] SYSTEM AND METHOD FOR REMOTE PATCHING OF OPERATING CODE LOCATED IN A MOBILE UNIT

[75] Inventors: Dale E. Beasley, Flower Mound; William C. Kennedy, III, Dallas; Kenneth R. Westerlage, Fort Worth, all of Tex.

[73] Assignee: Highwaymaster Communications, Inc., Dallas, Tex.

[21] Appl. No.: 422,075

[22] Filed: Apr. 12, 1995

[51] Int. Cl.$^6$ ................................................ G06F 13/00
[52] U.S. Cl. ................................................ 364/514 R
[58] Field of Search ........................ 364/514 R; 395/600, 395/700, 200.09; 379/56, 58, 59, 95; 455/31.1, 33.1, 54.1

[56] References Cited

U.S. PATENT DOCUMENTS

| Re. 34,034 | 8/1992 | O'Sullivan | 379/59 |
|---|---|---|---|
| 3,518,674 | 6/1970 | Moorehead et al. | 343/112 |
| 3,680,121 | 7/1972 | Anderson et al. | 343/112 TC |
| 3,714,650 | 1/1973 | Fuller et al. | 343/6.5 LC |
| 3,757,290 | 9/1973 | Ross et al. | 340/23 |

(List continued on next page.)

FOREIGN PATENT DOCUMENTS

| 3767589 | 2/1993 | Australia | G01S 5/02 |
|---|---|---|---|
| 0242099 | 10/1987 | European Pat. Off. | G01S 5/14 |
| 0290725 | 11/1988 | European Pat. Off. | H04Q 7/04 |
| 0367935 | 5/1990 | European Pat. Off. | H04Q 7/04 |
| 3516357 | 11/1986 | Germany | H04B 7/26 |
| 0161941 | 9/1984 | Japan | H04B 7/26 |
| 0175537 | 7/1988 | Japan | H04B 7/26 |
| 0219238 | 9/1988 | Japan | H04B 7/26 |
| 0226226 | 9/1989 | Japan | H04B 7/26 |
| 2193861 | 2/1988 | United Kingdom | H04Q 7/04 |
| 2221113 | 1/1993 | United Kingdom | G01S 5/00 |
| WO8904035 | 5/1989 | WIPO | G10L 5/06 |
| WO8912835 | 12/1989 | WIPO | G01S 5/02 |

OTHER PUBLICATIONS

"TRIMPACK" Brochure, TrimbleNavigation, date unknown, 1 page.

Gary D. Ott, "Vehicle Location in Cellular Mobile Radio Systems," *IEEE*, vol. VT-26, No. 1, Feb., 1977, pp. 43–46.

James C. Reynolds, et al., "GPS-Based Vessel Position Monitoring and Display System," IEEE, 1990, pp. 601–607.

R. DeSadaba, "Personal Communications in the Intelligent Network," *British Telecommunications Engineering*, vol. 9, Aug., 1990, pp. 80–83.

"GPS NAVSTAR Global Positioning System User's Overview—YEE–82–009D," *Navstar Global Positioning System Joint Program Office*, Mar., 1991, pp. 1–164.

"U.S. Coast Guard Differential GPS" Brochure, *U.S. Department of Transportation, United States Coast Guard*, May, 1993.

"GPS Facts & Figures" Brochure, *U.S. Department of Transportation, United States Coast Guard*, May, 1993.

(List continued on next page.)

Primary Examiner—Hassan Kizou
Assistant Examiner—Kwang Bin Yao
Attorney, Agent, or Firm—Baker & Botts, L.L.P.

[57] ABSTRACT

A system (10) for remote patching or updating of operating code located in a mobile unit (22, 24, 26, 28, or 30) is provided. The system (10) includes a manager host (16) and a mobile unit (22, 24, 26, 28, or 30). The manager host (16) is operable to initiate transmission through a communication network (12) of at least one discrete patch message defining at least one patch. The mobile unit (22, 24, 26, 28, or 30) is operable to receive the at least one patch message. The mobile unit (22, 24, 26, 28, or 30) is also operable to create patched operating code by merging the patch with current operating code located in the mobile unit (22, 24, 26, 28, or 30) and to switch execution to the patched operating code. The mobile unit (22, 24, 26, 28, or 30) can also receive at least one download message defining new operating code to replace the current operating code.

42 Claims, 5 Drawing Sheets

U.S. PATENT DOCUMENTS

| | | | |
|---|---|---|---|
| 3,789,409 | 1/1974 | Easton | 343/112 R |
| 3,848,254 | 11/1974 | Drebinger et al. | 343/112 R |
| 3,906,166 | 9/1975 | Cooper et al. | 179/41 A |
| 4,053,893 | 10/1977 | Boyer | 343/112 PT |
| 4,083,003 | 4/1978 | Haemming | 325/6 |
| 4,107,689 | 8/1978 | Jellinek | 343/23 |
| 4,152,693 | 5/1979 | Ashworth, Jr. | 340/24 |
| 4,177,466 | 12/1979 | Reagan | 343/112 TC |
| 4,222,052 | 9/1980 | Dunn | 343/112 R |
| 4,428,052 | 1/1984 | Robinson et al. | 364/436 |
| 4,428,057 | 1/1984 | Setliff et al. | 364/521 |
| 4,435,711 | 3/1984 | Ho et al. | 343/389 |
| 4,445,118 | 4/1984 | Taylor et al. | 343/357 |
| 4,547,778 | 10/1985 | Hinkle et al. | 343/456 |
| 4,590,569 | 5/1986 | Rogoff et al. | 364/452 |
| 4,644,351 | 2/1987 | Zabarsky et al. | 340/825.44 |
| 4,651,157 | 3/1987 | Gray et al. | 342/457 |
| 4,654,879 | 3/1987 | Goldman et al. | 455/33 |
| 4,660,037 | 4/1987 | Nakamura | 340/990 |
| 4,670,905 | 6/1987 | Sandvos et al. | 455/33 |
| 4,688,244 | 8/1987 | Hannon et al. | 379/58 |
| 4,700,374 | 10/1987 | Bini | 379/60 |
| 4,734,928 | 3/1988 | Weiner et al. | 379/59 |
| 4,737,978 | 4/1988 | Burke et al. | 379/60 |
| 4,740,792 | 4/1988 | Sagey et al. | 342/457 |
| 4,742,357 | 5/1988 | Rackley | 342/457 |
| 4,750,197 | 6/1988 | Denekamp et al. | 379/58 |
| 4,754,465 | 6/1988 | Trimble | 375/1 |
| 4,774,670 | 9/1988 | Palmieri | 364/446 |
| 4,775,999 | 10/1988 | Williams | 379/59 |
| 4,776,003 | 10/1988 | Harris | 379/91 |
| 4,788,637 | 11/1988 | Tamaru | 364/200 |
| 4,791,571 | 12/1988 | Takahashi et al. | 364/436 |
| 4,791,572 | 12/1988 | Green, III et al. | 364/449 |
| 4,796,189 | 1/1989 | Nakayama et al. | 364/449 |
| 4,797,948 | 1/1989 | Milliorn et al. | 455/54 |
| 4,799,162 | 1/1989 | Shinkawa et al. | 364/436 |
| 4,804,937 | 2/1989 | Barbiaux et al. | 340/52 F |
| 4,809,005 | 2/1989 | Counselman, III | 342/352 |
| 4,819,174 | 4/1989 | Furuno et al. | 364/444 |
| 4,833,477 | 5/1989 | Tendler | 342/389 |
| 4,833,701 | 5/1989 | Comroe et al. | 379/60 |
| 4,833,702 | 5/1989 | Shitara et al. | 379/60 |
| 4,843,575 | 6/1989 | Crane | 364/550 |
| 4,860,341 | 8/1989 | D'Avello et al. | 379/91 |
| 4,866,762 | 9/1989 | Pintar | 379/200 |
| 4,876,738 | 10/1989 | Selby | 455/33 |
| 4,884,208 | 11/1989 | Marinelli et al. | 364/460 |
| 4,891,650 | 1/1990 | Sheffer | 342/457 |
| 4,891,761 | 1/1990 | Gray et al. | 364/452 |
| 4,897,642 | 1/1990 | DiLullo et al. | 340/825.06 |
| 4,901,340 | 2/1990 | Parker et al. | 379/60 |
| 4,905,270 | 2/1990 | Ono | 379/58 |
| 4,907,290 | 3/1990 | Crompton | 455/56 |
| 4,908,629 | 3/1990 | Apsell et al. | 342/457 |
| 4,912,756 | 3/1990 | Hop | 379/60 |
| 4,914,686 | 4/1990 | Hager, III et al. | 379/61 |
| 4,945,570 | 7/1990 | Gerson et al. | 381/110 |
| 4,953,198 | 8/1990 | Daly et al. | 379/61 |
| 4,963,865 | 10/1990 | Ichikawa et al. | 340/995 |
| 4,993,062 | 2/1991 | Dula et al. | 379/88 |
| 4,998,291 | 3/1991 | Marui et al. | 455/89 |
| 5,003,317 | 3/1991 | Gray et al. | 342/457 |
| 5,008,814 | 4/1991 | Mathur | 364/200 |
| 5,014,206 | 5/1991 | Scribner et al. | 364/449 |
| 5,019,963 | 5/1991 | Alderson et al. | 364/200 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,045,861 | 9/1991 | Duffett-Smith | 342/457 |
| 5,046,082 | 9/1991 | Zicker et al. | 379/59 |
| 5,055,851 | 10/1991 | Sheffer | 342/457 |
| 5,058,201 | 10/1991 | Ishii et al. | 455/33 |
| 5,068,656 | 11/1991 | Sutherland | 340/989 |
| 5,090,050 | 2/1992 | Heffernan | 379/60 |
| 5,101,500 | 3/1992 | Marui | 455/33 |
| 5,119,102 | 6/1992 | Barnard | 342/357 |
| 5,121,126 | 6/1992 | Clagett | 342/419 |
| 5,121,325 | 6/1992 | DeJonge | 364/442 |
| 5,131,019 | 7/1992 | Sheffer et al. | 379/39 |
| 5,131,020 | 7/1992 | Liebesny et al. | 379/59 |
| 5,142,281 | 8/1992 | Park | 340/991 |
| 5,142,654 | 8/1992 | Sonberg et al. | 379/59 |
| 5,155,490 | 10/1992 | Spradley, Jr. et al. | 342/357 |
| 5,155,847 | 10/1992 | Kirouac et al. | 395/600 |
| 5,159,625 | 10/1992 | Zicker | 379/59 |
| 5,166,694 | 11/1992 | Russell et al. | 342/457 |
| 5,172,321 | 12/1992 | Ghaem et al. | 364/444 |
| 5,208,756 | 5/1993 | Song | 364/449 |
| 5,223,844 | 6/1993 | Mansell et al. | 342/357 |
| 5,225,842 | 7/1993 | Brown et al. | 342/357 |
| 5,235,633 | 8/1993 | Dennison et al. | 379/60 |
| 5,237,612 | 8/1993 | Raith | 380/23 |
| 5,243,529 | 9/1993 | Kashiwazaki | 364/449 |
| 5,247,564 | 9/1993 | Zicker | 379/40 |
| 5,252,982 | 10/1993 | Frei | 342/357 |
| 5,261,118 | 11/1993 | Vanderspool, II et al. | 455/51.2 |
| 5,270,936 | 12/1993 | Fukushima et al. | 364/444 |
| 5,276,729 | 1/1994 | Higuchi et al. | 379/58 |
| 5,293,163 | 3/1994 | Kakihara et al. | 340/995 |
| 5,297,191 | 3/1994 | Gerszberg | 379/59 |
| 5,297,192 | 3/1994 | Gerszberg | 379/59 |
| 5,299,132 | 3/1994 | Wortham | 364/460 |
| 5,311,194 | 5/1994 | Brown | 342/357 |
| 5,323,322 | 6/1994 | Mueller et al. | 364/449 |
| 5,365,516 | 11/1994 | Jandrell | 370/18 |
| 5,371,692 | 12/1994 | Draeger et al. | 364/580 |
| 5,392,458 | 2/1995 | Sasuta et al. | 455/54.1 |
| 5,396,540 | 3/1995 | Gooch | 379/59 |
| 5,430,877 | 7/1995 | Naylor | 395/700 |
| 5,495,610 | 2/1996 | Shing et al. | 395/600 |

OTHER PUBLICATIONS

D. H. Alsip, J. M. Butler, and J. T. Radice, "Implementation of the U.S. Coast Guard's Differential GPS Navigation Service," *U.S. Coast Guard Headquarters, Office of Navigation Safety and Waterway Services, Radionavigation Division*, Jun. 28, 1993, pp. 1–10.

"Motorola GPS Technical Reference Manual," *Motorola*, Oct., 1993, Manual Cover, Title Page, and pp. 4–109.

Don Burtis, "CDPD—A Bandwidth Optimization Technique for Cellular Telephones," *Computer Design's OEM Integration*, May, 1994, pp. 19–20.

"U.S. Coast Guard Bulletin Board System File 'FRP-DGPS,'" *U.S. Coast Guard*, Date Unknown, pp. 1–6.

Gene L. Schlechte, LCDR, "U.S. Coast Guard Bulletin Board System Document 'DESIGN.TXT'—Design Process for the United States Coast Guard's Differential GPS Navigation Service," *U.S. Coast Guard, U.S. Coast Guard Omega Navigation System Center*, Date Unknown, pp. 1–21.

"Appendix B, The 1991 Radionavigation User Conference," *Department of Transportation*, Date Unknown, pp. 1–2.

Kirk Ladendorf, "First in Flight—Using State–Of–The–Art Technology, Austin–Based Arrowsmith Technologies Establishes Itself As A Major Player in Nascent Technology–Supplier Market", *Austin America–Statesman*, Jan. 30, 1995, 3 pages.

| MESSAGE | TYPE | MESSAGE FORMAT | | | | | | |
|---|---|---|---|---|---|---|---|---|
| NEW PATCH FILE MESSAGE | 0 | MESSAGE TYPE (1 BYTE) | PATCH FILE ID (1 BYTE) | SOFTWARE VERSION (8 BYTES) | NUMBER OF PATCHES (1 BYTE) | MEMORY ADDRESS TO BE MODIFIED BY PATCH (4 BYTES) | STARTING ADDRESS IN PATCH MEMORY SPACE (4 BYTES) | NUMBER OF BYTES OF DATA (1 BYTE) | PATCH DATA (1-232 BYTES) |
| APPEND PATCH MESSAGE | 1 | MESSAGE TYPE (1 BYTE) | PATCH FILE ID (1 BYTE) | MEMORY ADDRESS TO BE MODIFIED BY PATCH (4 BYTES) | STARTING ADDRESS IN PATCH MEMORY SPACE (4 BYTES) | NUMBER OF BYTES OF DATA (1 BYTE) | PATCH DATA (1-241 BYTES) | | |
| APPEND DATA MESSAGE | 2 | MESSAGE TYPE (1 BYTE) | PATCH FILE ID (1 BYTE) | PATCH EXTENSION DATA (1-250 BYTES) | | | | | |
| DELETE UNINCORPORATED PATCHES MESSAGE | 3 | MESSAGE TYPE (1 BYTE) | | | | | | | |
| PREPARE FOR DOWNLOAD MESSAGE | 4 | MESSAGE TYPE (1 BYTE) | | | | | | | |
| DOWNLOAD MESSAGE | 5 | MESSAGE TYPE (1 BYTE) | RECORD TYPE (2 BYTES) | RECORD LENGTH (1 BYTE) | STARTING ADDRESS (2-4 BYTES) | PROGRAM DATA (1-100 BYTES) | RECORD CHECKSUM (1 BYTE) | | |
| PROGRAM CHECKSUM MESSAGE | 6 | MESSAGE TYPE (1 BYTE) | PROGRAM CHECKSUM (2 BYTES) | | | | | | |

SYSTEM AND METHOD FOR REMOTE PATCHING OF OPERATING CODE LOCATED IN A MOBILE UNIT

TECHNICAL FIELD OF THE INVENTION

This invention relates in general to the field of electronic systems, and more particularly to a system and method for remote patching of operating code located in a mobile unit.

BACKGROUND OF THE INVENTION

Software suppliers and other sellers of computer systems often have a need for correcting or upgrading existing software used by their customers. Common methods of doing so include the distribution of floppy disks and tapes and the provision of modem support. However, the distribution of floppy disks and tapes is time consuming and forces the customer to use the old software while waiting for updates. Modem support can be used to link directly to the consumer's remote computer system and manually upgrade the software. However, such manual upgrade is time consuming, expensive and prone to human error.

Additionally, a central computer system has been used to provide access to software updates from systems at fixed remote locations. One such system is disclosed in U.S. Pat. No. 5,155,847 entitled "*Method and Apparatus for Updating Software at Remote Locations.*"

U.S. Pat. No. 5,155,847 discloses a central computer system that can monitor and record changes to versions of software. A user having a fixed remote system operating an old version of software may access the central computer system. If changes are applicable to the software used by the remote system, the central computer system can provide patches to the remote system for updating the software.

However, the system disclosed by U.S. Pat. No. 5,155,847 discloses remote systems at fixed locations that access a central computer system over an on-line communication link that allows interactive and bidirectional communication. The remote systems participate in a single, continuous communication session that is terminated after the remote user receives the appropriate patches.

SUMMARY OF THE INVENTION

In accordance with the present invention, disadvantages and problems associated with prior systems and methods for updating software have been substantially reduced or eliminated. One aspect of the present invention provides remote patching of operating code located in a mobile unit.

According to an embodiment of the present invention, a system for remote patching of operating code located in a mobile unit is provided. The system includes a manager host and a mobile unit. The manager host is operable to initiate transmission through a communication network of at least one discrete patch message defining at least one patch. The mobile unit is operable to receive the at least one patch message. The mobile unit is also operable to create patched operating code by merging the at least one patch with current operating code located in the mobile unit and to switch execution to the patched operating code.

According to another embodiment of the present invention, a method for remote patching of operating code located in a mobile unit is provided. At least one discrete patch message defining at least one patch is transmitted through a communication network. The at least one patch message is received in a first mobile unit where the first mobile unit is executing current operating code located in the mobile unit. Patched operating code is created in the mobile unit by merging the at least one patch with the current operating code. Execution in the mobile unit is switched to the patched operating code.

A technical advantage of the present invention is allowing remote patching of operating code located in a mobile unit without physically touching the mobile unit or establishing a bidirectional and interactive communication link. The patching of code may be to fix software bugs, add new functionality, or completely replace the existing version of code with a new version.

An additional technical advantage of the present invention is the provision of mobile units operable to interpret patch messages and create patched operating code therefrom without affecting the normal functions performed by the mobile unit.

According to another technical advantage of the present invention, patches are broadcast to a number of mobile units from a central location. The central location operates to keep track of the location of each mobile unit and how to deliver patch messages. The central location can also tailor the broadcasts of patches to different mobile units.

According to an additional technical advantage of the present invention, patches are sent as several discrete patch messages to a mobile unit, reception of the discrete patch messages is verified by the mobile unit, and patch information is combined by the mobile unit to create a complete patch file used to patch current operating code. The patches can be sent in a single or multiple communication sessions.

BRIEF DESCRIPTION OF THE DRAWINGS

For a more complete understanding of the present invention and for further features and advantages, reference is now made to the following description taken in conjunction with the accompanying drawings, wherein like reference numerals represent like parts, in which.

DETAILED DESCRIPTION OF THE INVENTION

Figure 1:
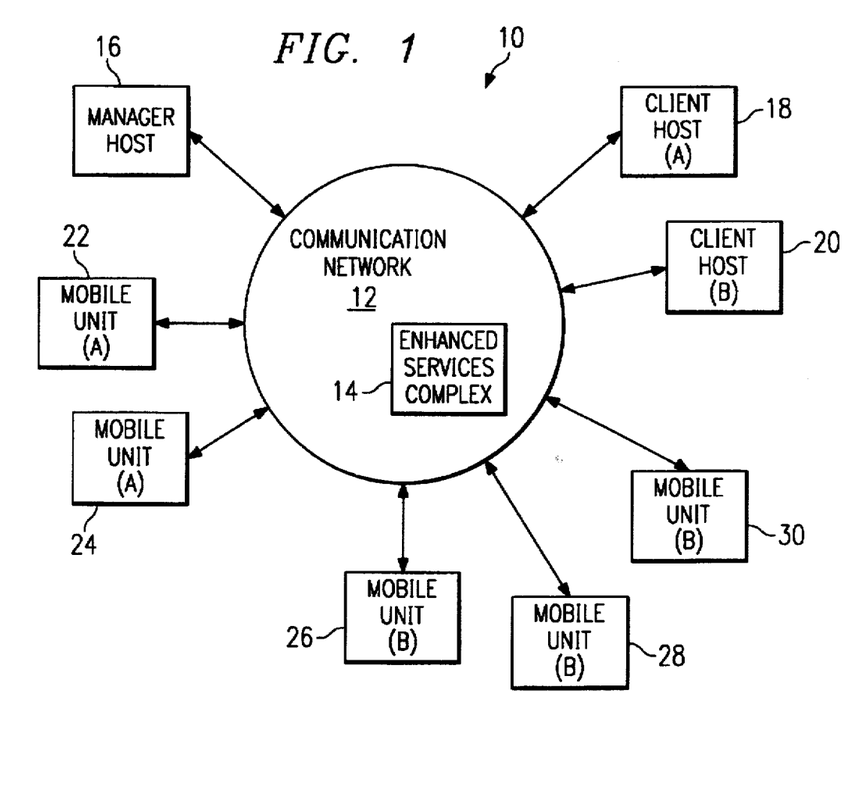
FIG. 1 illustrates one embodiment of a system for remote patching of operating code located in a mobile unit.

FIG. 1 illustrates one embodiment of a system, indicated generally at 10, for remote patching of operating code located in a mobile unit. System 10 comprises a communication network 12 that includes an enhanced services complex 14.

Communication network 12 may include one or a combination of several communication technologies, such as a wireless communication network like the cellular telephone network, a land-line communication network, another portion of the public switched telephone network (PSTN), a dedicated communication link, or any other appropriate communication link. Communication network 12 can support data transmissions or data and voice transmissions simultaneously. The type of communication link utilized in communication network 12 may vary between components of system 10, as described below.

A manager host 16 is coupled to enhanced services complex 14 using communication network 12. A first client host 18 and a second client host 20 also are coupled to enhanced services complex 14 in a similar manner as manager host 16. Manager host 16, first client host 18, and second client host 20 can be separate from or integral to enhanced services complex 14.

A first mobile unit 22 and a second mobile unit 24 are associated with first client host 18 and are coupled to enhanced services complex 14 using communication network 12. Similarly, a third mobile unit 26, a fourth mobile unit 28 and a fifth mobile unit 30 are associated with second client host 20 and are coupled to communication network 12. In the preferred embodiment, the communication link of the communication network 12 that couples mobile units 22, 24, 26, 28, and 30 with the enhanced services complex 14 is a wireless or mobile communication network, such as a cellular telephone network.

In the embodiment of FIG. 1, manager host 16 provides support to client host 18 and client host 20 with respect to processing of information messages exchanged between enhanced services complex 14 and associated mobile units 22, 24, 26, 28 and 30 via communication network 12. For example, client host 18 and client host 20 can receive status information from and provide dispatching information to mobile units 22 and 24 and mobile units 26, 28 and 30, respectively. Manager host 16 provides support for systems operating in both client hosts 18 and 20 and mobile units 22, 24, 26, 28 and 30.

At times, manager host 16 might desire to enhance, correct, or replace current operating code located in one or more of the mobile units. A patch file can be created that defines one or more patches that need to be made to provide enhancements or corrections to the current operating code. In addition to the patch or patches, the patch file can provide a new version number and a new checksum for the resulting patched operating code. The version number can provide information such as the phase, release, revision and modifications made. Furthermore, as described below, the messages can also define a completely new version of the software that is to replace the current version running at the mobile units. Therefore, the description of the components and operation of sending patch messages to mobile units applies equally to the transmission of download messages that combine to form new operating code to replace the current operating code.

According to the teachings of the present invention, the patch file can be represented by a set of discrete patch messages. Each patch message can be sized as a discrete data payload suitable for transmission in a message through communication network 12. Manager host 16 can transmit the discrete patch messages to appropriate mobile units. When a mobile unit receives the patch messages, the mobile unit can verify the patch messages, merge the defined patches with the current operating code, and switch execution to the patched operating code. In order to receive a complete patch file, each mobile unit receives all of the patch messages in the set representing the patch file. The transmission of discrete patch messages does not require a dedicated or interactive communication link, and can be performed in several communication sessions. For example, due to the inherent limitations of wireless communication, the communication link to the mobile unit may be lost. System 10 can then reestablish the communication link and continue transmission of the current patch message.

In this manner, operating code located in a mobile unit may be maintained and updated without the need for manager host 16 physically to contact the mobile unit. In addition, manager host 16 can provide varying levels of enhancements to mobile units associated with different client hosts and remotely maintain the operating code associated with each level of enhancement. This can be accomplished by addressing patch messages to the appropriate mobile units. For example, mobile units 22 and 24 associated with client host 18 can have a different version of operating code than mobile units 26, 28 and 30 associated with client host 20.

Manager host 16 can transmit discrete patch messages, according to the teachings of the present invention, in order to overcome limitations inherent in communication network 12. The communication link to the mobile units in communication network 12 can comprise any wireless or mobile communication system using land-based or space-based transmitters, receivers, or transceivers, such as a cellular telephone network, a personal communication system (PCS), a specialized mobile radio (SMR), an enhanced specialized mobile radio (ESMR), citizen's band (CB), a paging network, a satellite-based communication network, or any other communication system supporting transmission of data to the mobile units.

Due to the nature of wireless communication, transmission of large amounts of data over communication network 12 can be expensive, error prone, and risky. For example, wireless communications may not be appropriate for an on-line session that requires bidirectional and interactive communications over an extended period of time. Further, in such a system, a mobile unit might be required to limit normal operation until the transmission of data was complete. Normal communication of messages between a client host and an associated mobile unit would be disrupted and the mobility of the mobile unit would be restricted. For example, if an on-line communication link over a cellular network were used, a mobile unit would be forced to stop at the edge of network coverage in order to maintain the communication link. The present invention overcomes these limitations of wireless communication by broadcasting short messages over one or several separate communication sessions that do not require interactive or substantial bidirectional communication. Furthermore, the present invention can resume transmissions when the communication link is lost without sacrificing a significant loss of previously transmitted data.

Each mobile unit 22, 24, 26, 28, and 30 can be associated with a vehicle, person, or other mobile entity. Each mobile unit 22, 24, 26, 28, and 30 operates by executing the current operating code located in the mobile unit. The mobile units 22, 24, 26, 28, and 30 may perform various communicating, locating, and fleet management functions as described in U.S. Pat. No. 5,155,689 entitled "Vehicle Locating and Communicating Method and Apparatus".

In operation, manager host 16 can accomplish remote patching of operating code located in mobile units 20, 22, 24, 26, 28 and 30 by transmitting a set of discrete patch messages through communication network 12. The discrete patch messages collectively represent a patch file defining at least one patch to be made to current operating code located in one or more of mobile units 20, 22, 24, 26, 28 and 30. Each mobile unit 20, 22, 24, 26, 28 and 30 is operable to receive the patch messages transmitted by manager host 16. Each mobile unit 20, 22, 24, 26, 28 and 30 can create patched operating code by merging the defined patch or patches with the current operating code and can switch execution to the patched operating code. The discrete patch messages can comprise packets that can be transmitted before or after voice communication, during dead time of conversation or other suitable time period for transmitting packet sized data.

Manager host 16 can address patch messages to mobile units as appropriate for the patch file being transmitted. Manager host 16 can address a patch message to one of the mobile units, to all of the mobile units, or to a group of mobile units. A patch message addressed to all of the mobile units can be referred to as a broadcast message. A patch message addressed to a group can correspond to mobile units associated with client host 18 or client host 20. For example, manager host 16 can address a patch message such that it will be transmitted to both mobile unit 22 and mobile unit 24 associated with client host 18.

In the embodiment of FIG. 1, enhanced services complex 14 of communication network 12 operates to handle all messages transmitted between manager host 16, client host 18, client host 20 and mobile units 22, 24, 26, 28, and 30. In particular, enhanced services complex 14 maintains information to establish communication with mobile units 22, 24, 26, 28, and 30 using communication network 12. Enhanced services complex 14 then ensures that message data is delivered with integrity. Part of the operation of enhanced services complex 14 is to handle patch messages transmitted by manager host 16 to mobile units 22, 24, 26, 28, and 30. Enhanced services complex 14 recognizes whether a patch message is addressed to one mobile unit, a group of mobile units or all mobile units, establishes communication with the appropriate mobile units, and transmits the discrete patch message. application Ser. No. 08/095,166 entitled "Method and Apparatus for a Nation-wide Cellular Telephone Network" describes in detail the components and functionality of enhanced services complex 14, and is herein incorporated by reference. Enhanced services complex 14 and manager host 16 can be separate components in system 10, or integrated into a single platform as described in application Ser. No. 08/095,166.

A technical advantage of the present invention is allowing remote patching of operating code located in a mobile unit without physically touching the mobile unit or establishing an on-line communication link. An additional technical advantage of the present invention is the provision of mobile units operable to interpret patch messages and create patched operating code therefrom without affecting the normal functions performed by the mobile unit. According to another technical advantage of the present invention, a mobile unit can provide feedback regarding the current version of operating code located in the mobile unit and can provide verification of completion of patches to the current operating code.

Figure 2:
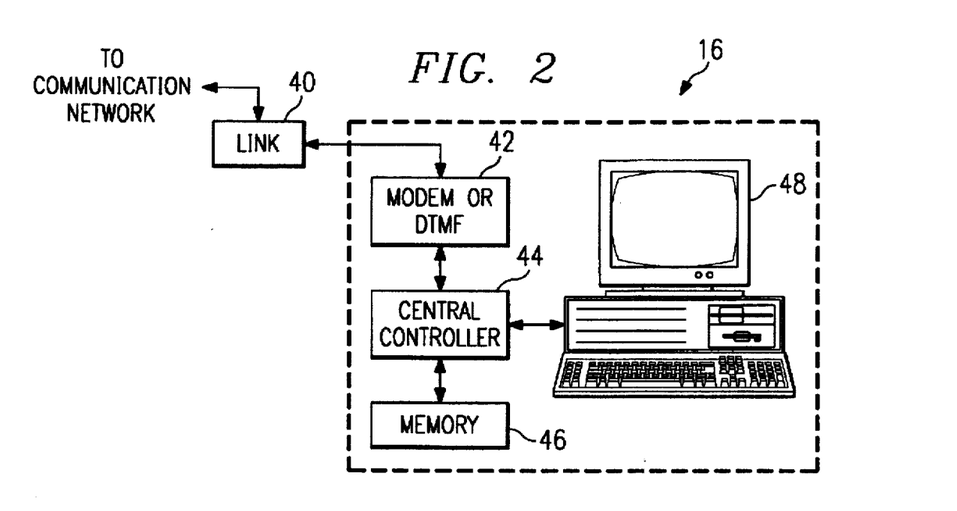
FIG. 2 is a schematic representation of one embodiment of a manager host.

FIG. 2 is a schematic representation of one embodiment of a manager host 16. Manager host 16 communicates with mobile units using link 40 to communication network 12. Link 40 may be one or a combination of dedicated or switched telephone lines in the mobile or land-line public switched telephone network (PSTN), or other land-based communication links, satellite-based communication links, or any other suitable communication link that allows manager host 16 to transmit messages to or receive messages from communication network 12.

A message received from a mobile unit enters manager host 16 through a modem, DTMF coder/decoder, or other data encoder 42 and passes to central controller 44. Conversely, a message transmitted to a mobile unit passes from central controller 44 through coder/decoder 42 to communication network 12.

Memory 46 and input/output device 48 are coupled to central controller 44. Central controller 44 receives and processes messages from mobile units. Central controller 44 also transmits messages to mobile units including patch messages addressed to appropriate mobile units. Memory 46 may be RAM, ROM, CD-ROM, removable memory devices, or any other device that allows storage and retrieval of data. Input/output device 48 includes any variety of output devices, such as a display, a speaker to provide audible information, removable storage media, or any other appropriate output device. Input/output device 48 may also include a variety of input devices, such as a keyboard, mouse, touchscreen, removable storage media, or any other appropriate input device.

Figure 3:
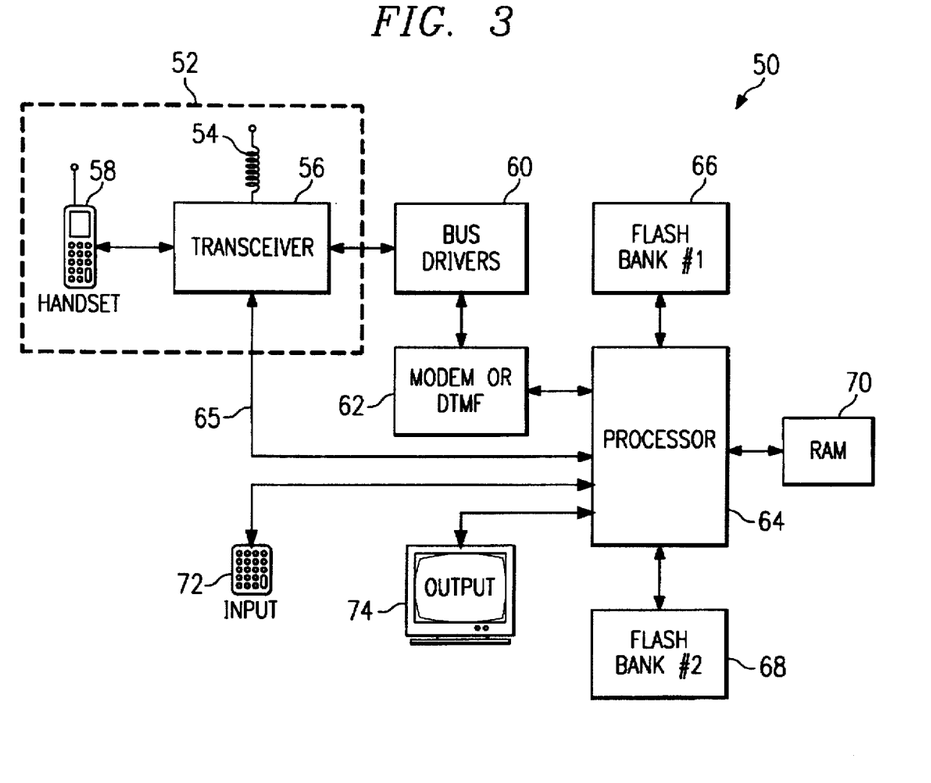
FIG. 3 is a schematic representation of one embodiment of a mobile unit.

FIG. 3 is a schematic representation of one embodiment of a mobile unit, indicated generally at 50. Mobile units 22, 24, 26, 28, and 30 of FIG. 1 may be constructed in a similar manner as mobile unit 50 of FIG. 3. Mobile unit 50 comprises a mobile communications device 52 including an antenna 54 coupled to a transceiver 56. A handset 58 is also coupled to transceiver 56. Transceiver 56 is coupled to bus drivers 60 which in turn are coupled to a modem, DTMF coder/decoder, or other data encoder 62. Coder/decoder 62 is coupled to processor 64. Transceiver 56 is also coupled to processor 64 over link 65.

Processor 64 is coupled to a first flash bank 66 and to a second flash bank 68 and to a RAM 70. First flash bank 66, second flash bank 68, and RAM 70 may be RAM, ROM, CD-ROM, removable memory devices, or any other device that allows storage and retrieval of data. Furthermore, first flash bank 66, second flash bank 68, and RAM 70 may be separate devices or portions of one or more devices. An input device 72 and an output device 74 are also coupled to processor 64.

In operation, mobile communications device 52 receives and transmits messages over communication network 12. The messages received by transceiver 56 are passed to processor 64 either over link 65 or over other appropriate path such as bus drivers 60 and coder/decoder 62. Processor 64 manages the operation of mobile unit 50. Handset 58 provides additional voice or data communication. First flash bank 66 and second flash bank 68 are operable to store operating code for execution by processor 64, and RAM 70 is operable to provide processor 64 with memory work space.

In operation, processor 64 executes current operating code out of first flash bank 66 or second flash bank 68. Processor 64 performs functions according to the current operating code. When processor 64 receives one or more patch messages representing a complete patch file, processor 64 analyzes the patch messages to determine whether processor 64 should initiate a patch process. If processor 64 is currently executing an appropriate version of operating code suitable to receive the defined patch or patches, processor 64 initiates the patch process to implement the patch or patches defined by the patch messages.

Processor 64 stores patch information defined by the patch messages in RAM 70. If processor 64 is executing out of first flash bank 66, processor 64 creates patched operating code in second flash bank 68 by merging the patch information with the current operating code. After the patched operating code is created, processor 64 sets a flag indicating that further execution should occur out of second flash bank 68. Processor 64 then initiates a reset so that mobile unit 50 restarts with processor 64 executing the patched operating code located in second flash bank 68. An analogous switch from second flash bank 68 to first flash bank 66 can occur when the current operating code is located in second flash bank 68. In this manner, mobile unit 50 can enhance, correct, or replace the current operating code based upon discrete patch or download messages transmitted over communication network 12.

The components of mobile unit 50 shown in FIG. 3 may be packaged into one or more housings. Mobile unit 50 may be mounted to a vehicle or associated with other movable objects. Mobile unit 50 may also be packaged as a portable, hand-held device that provides personal functions. For example, a portable, hand-held mobile unit 50 may be used by surveyors, rescue teams, individuals that may change forms of transportation, or any other application requiring portability of mobile unit 50.

Figure 4:
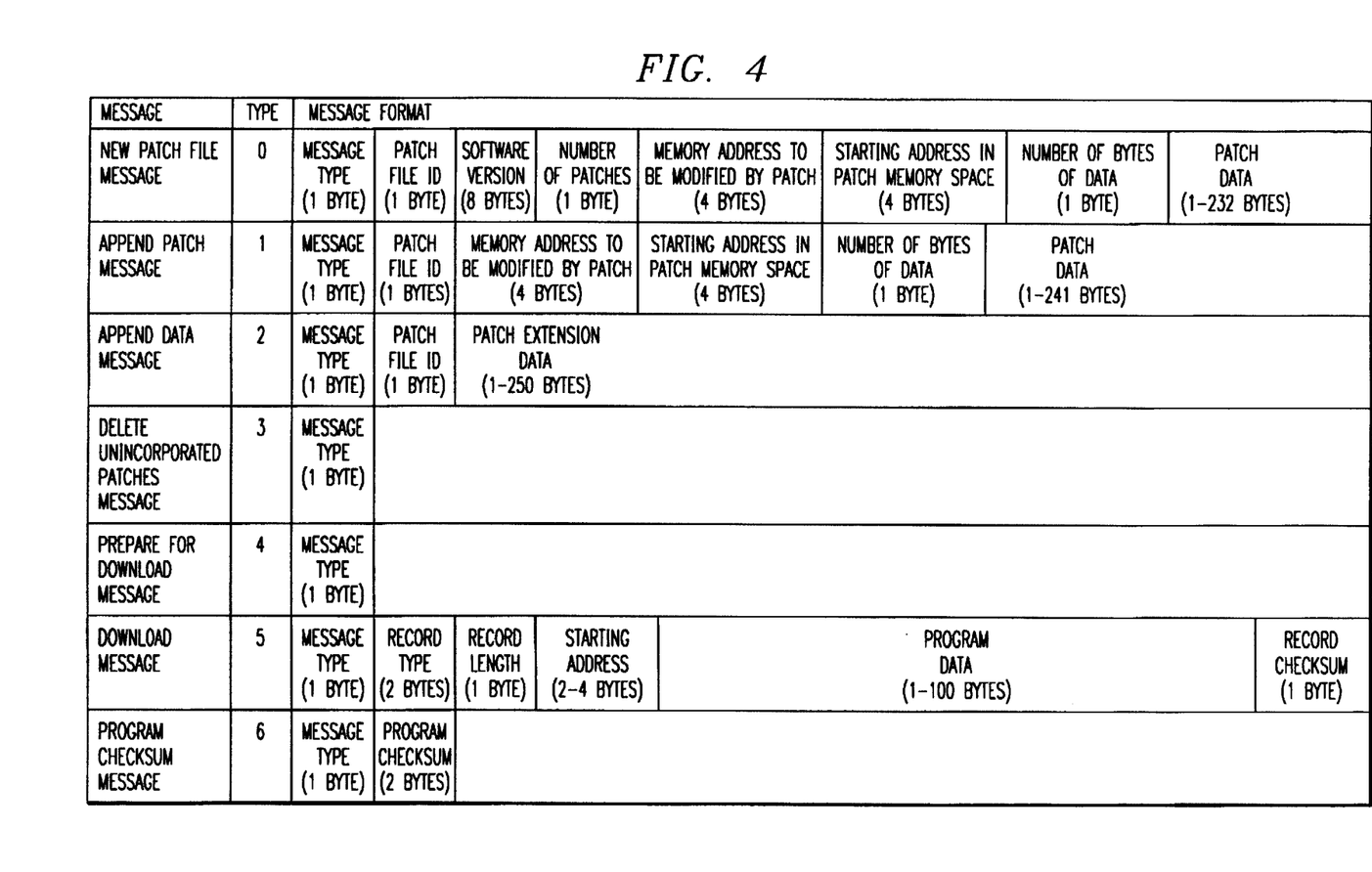
FIG. 4 illustrates one embodiment of message formats for patch messages used to represent a patch file.

FIG. 4 illustrates one embodiment of message formats for transmission over communication network 12 to mobile units. The first three message types relate to patch messages for incorporating patches of code into existing code on the mobile units. The last three messages relate to direct program download messages for replacing the current code in the mobile unit with a new version of code. All message formats shown in FIG. 4 are inserted in a general message format, that begins with a start, message type, length, and identifier field and ends with a checksum and end field. These messages can be sized to accommodate optimal or preferred message sizes for different technologies in communication network 12.

The patch messages include: a new patch file message, an append patch message, an append data message, and a delete unincorporated patches message. These patch messages are designated as type "0", "1", "2", and "3" respectively. In the illustrated embodiment, each patch message includes up to 252 bytes of information.

A new patch file message operates to indicate to a mobile unit that a set of one or more patch messages representing a new patch file is being transmitted. As described above, the set of patch messages will define a patch or patches to be made to current operating code. The new patch file message also operates to define the first patch.

A new patch file message includes eight fields, as shown in FIG. 4. The new patch file message includes a "message type" field which is one byte and holds a "0" indicating that the message is a new patch file message. A "patch file ID" field is one byte and comprises a unique identification number for the patch file represented by the set of patch messages. Each patch message associated with the patch file includes this unique patch file ID. A "software version" field is eight bytes and provides an indication of which operating code versions are appropriate for receiving the patch or patches contained in the represented patch file. The software version can operate as a mask to indicate such things as phase, release, revision, and modifications made. A "number of patches" field is one byte and gives the total number of patches that are included in the set of patch messages identified by the patch file ID. Each patch may be represented by one or more discrete patch messages. A "memory address to be modified by patch" field is four bytes and identifies the memory address of the current operating code to be modified by the first patch which is defined by the new patch file message. A "starting address in patch memory space" field is four bytes and defines the starting address in the patched operating code where the first patch is to be written. A "Number of bytes of data" field is one byte and defines the number of bytes of information in a "patch data" field. Lastly, the "patch data" field can include from one to 232 bytes and holds the data associated with the first patch.

An append patch message operates to define an additional patch to be made to current operating code. The append patch message includes six fields that are similar to fields in the new patch file message. A "message type field" is one byte and is a "1" to indicate an append patch message. A "patch file ID" field is one byte and comprises the unique identification number for the patch file. This patch file ID must match the patch file ID contained in the previous new patch file message. A "memory address to be modified by patch" field is four bytes and identifies the memory address of the current operating code to be modified by the additional patch defined by the append patch message. A "starting address in patch memory space" field is four bytes and defines the starting address in the patched operating code where the additional patch is to be written. A "number of bytes of data" field is one byte and defines the number of bytes of information in a "patch data" field. Lastly, the "patch data" field can include from one to 241 bytes and holds the data associated with the additional patch.

An append data message operates to provide patch extension data where the data associated with a patch requires more space than is available in the patch data field of a new patch file message or an append patch message. The append data message includes three fields. A "message type" field is one byte and is a "2" to indicate an append data message. A "patch file ID" field is one byte and comprises the unique identification number for the patch file. This patch file ID must match the patch file ID contained in the previous new patch file message. Lastly, a "patch extension data" field can include from one to 250 bytes and holds additional data associated with a patch. There can be one or more append data messages associated with a new patch file message or an append patch message depending upon the number of bytes of data needed to define the associated patch.

The delete unincorporated patches message includes a single "message type" field which is one byte and holds a "3". After receiving an entire set of patch messages, the mobile unit may perform an end-to-end checksum of the patched messages or the patched operating code. If there is a checksum error, the mobile unit informs manager host 16 of the checksum error. Manager host 16 may then send the delete unincorporated patches message to the mobile unit so that the transmission of patch messages can be repeated.

A new patch file message defines one patch, and each append patch message defines an additional patch. Thus, for a set of discrete patch messages, the total of the new patch file message plus the append patch messages equals the "number of patches" field in the new patch file message. The set of discrete patch messages also can include a number of append data messages. Append data messages provide extension data as necessary for a new patch file message or one of the append patch messages. Append data messages complete the patch definition if any of the patches require more bytes of data than available in the "patch data" field of a new patch file message or an append patch message.

Using the patch message formats illustrated in FIG. 4, a complete patch file may be transmitted through communication network 12 using at least one discrete patch message representing the patch file. Each discrete patch message can have a separate checksum associated with it. Thus, each message can be separately verified. A mobile unit can initiate a patch process after all patch messages in a set are received and verified. For the embodiment of patch messages illustrated in FIG. 4, the patch messages are received in proper sequence although the length of time between receipt of each patch message is unimportant. Other embodiments of discrete patch messages can include additional fields that define such things as sequence and could be received in any order. Each mobile unit can operate to determine whether a patch message has been missed and to request a patch message or complete set to be retransmitted.

A patch file and associated patch messages can be generated manually or automatically. In general, a patch may insert a jump command into the current operating code causing a jump to additional code. The additional code can return execution to the point following the jump command. A patch may alternatively simply overwrite current operating code. Additionally, the current operating code may include empty space following each module to provide room for expansion by patches. Other embodiments of patches are possible. The embodiments of patch messages and patches described with respect to FIG. 4 are not intended nor should be construed to limit the scope of the present invention.

The direct program download messages include: a prepare for download, a download message, and a program checksum message. These patch messages are designated as type "4", "5" and "6", respectively. In the illustrated embodiment, each download message includes up to 109 bytes of information.

The prepare for download message includes a single "message type" field which is one byte and holds a "4", which informs the mobile unit that a new program download is about to be transmitted. In response, the mobile unit erases first flash bank 66 or second flash bank 68 in preparation for receiving new operating code.

The download message transmits the actual data that combines to form the new operating code that replaces the current operating code of the mobile unit. Normally, the mobile unit receives several download messages that combine to form the new operating code. The download message includes six fields, as shown in FIG. 4. The download message has a "message type" field which is one byte and holds a "5" indicating that the message is a download message. The "record type" field contains two bytes and indicates the format of the remaining data in the message. The "record length" field is one byte long and indicates the length of the remaining message. The "starting address" field can be between two and four bytes long and defines a starting address in first flash bank 66 or second flash bank 68 to insert the data contained in the download message. The "program data" field contains up to 100 bytes that define a portion of the new operating code for the mobile unit. The "record checksum" field contains a single byte that is used by the mobile unit to confirm the integrity of the received download message.

The new program checksum message includes two fields. A one-byte "message type" field holds a "6", which informs the mobile unit that the program download is complete and that a program checksum value follows. A "new checksum" field contains a two-byte checksum to verify the integrity of the new operating code combined from the download messages received at the mobile unit.

Using the download message formats illustrated in FIG. 4, new operating code may be transmitted through communication network 12 using at least one download message representing the new operating code. Each download message includes a separate record checksum to verify the integrity of each download message transmission. Upon receipt and verification of a single download message, the mobile unit transmits an acknowledgement to manager host 16 that the download message has been accurately received. The program data from each download message is then loaded into first flash bank 66 or second flash bank 68 at the address specified in the download message. Additionally, an end-to-end checksum on the new operating code can be used to verify the complete set of download messages loaded in memory. After verifying receipt of the new operating code, the mobile unit swaps out the current operating code with the new operating code and initiates a reset to execute the new code. The download messages can be received in any sequence and over any number of communication sessions. By receiving acknowledgements from the mobile unit, manager host 16 or enhanced services complex 14 can monitor which download messages have been sent and when the transmission of the set of download messages is complete.

Figure 5:
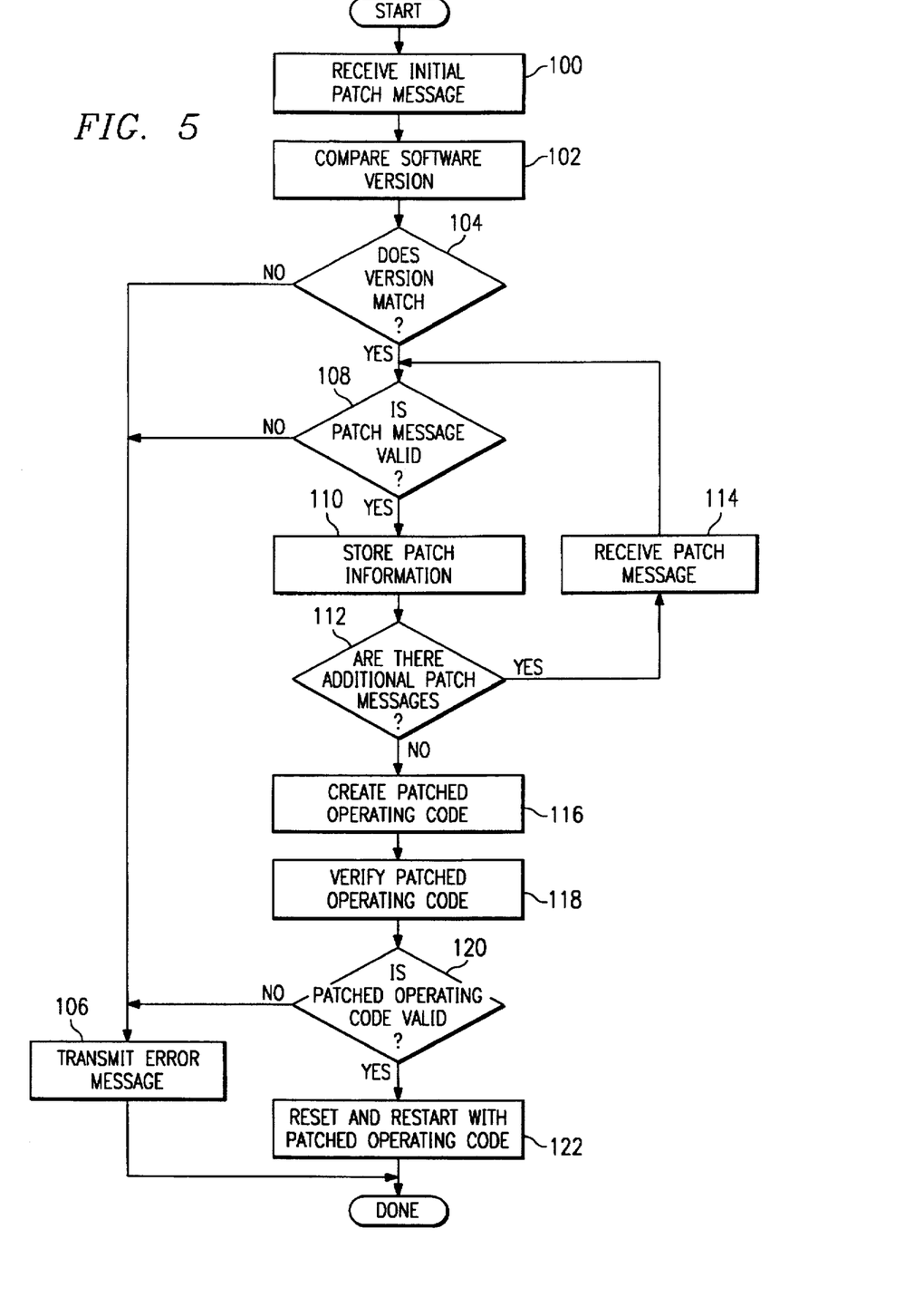
FIG. 5 is a flow chart showing one embodiment of a method of operation of a mobile unit for remote patching of operating code located in the mobile unit.

FIG. 5 is a flow chart showing one embodiment of a method of operation of a mobile unit for remote patching operating code. The method of FIG. 5 is one embodiment of a patch process by which a mobile unit can receive a set of patch messages collectively representing a patch file, can merge the defined patches with the current operating code to create patched operating code, and can switch execution to the patched operating code. A similar operation could be used to receive several download messages defining new operating code to replace the current operating code in the mobile unit.

In step 100, the mobile unit receives an initial patch message which includes a software version. In one embodiment of the present invention, the initial patch message comprises a new patch file message as described with respect to FIG. 4. In step 102, the mobile unit compares the software version provided by the initial patch message with the software version of the mobile unit's current operating code. In step 104, the mobile unit determines whether the software version of the current operating code is appropriate for the patches defined by the set of patch messages. If not, the mobile unit transmits an appropriate error message in step 106. This error message can be addressed to manager host 16, an associated client host 18 and 20, or both.

If the current operating code is an appropriate version, the mobile unit checks whether the initial patch message is valid in step 108. This validity check can comprise a checksum technique or other appropriate validity check. If the patch message is not valid, the mobile unit transmits an appropriate error message in step 106. If the patch message is valid, then the mobile unit stores the associated patch information in step 110. The mobile unit may also send an acknowledgment that the patch message was valid. In one embodiment, the patch information is stored in RAM 70 that is used as a work space. In step 112, the mobile unit determines whether there are additional patch messages to be received. If so, the mobile unit receives the next patch message in step 114. In one embodiment of the present invention, the next patch message comprises either an append patch message or an append data message as described with respect to FIG. 4. The mobile unit checks the validity of the next patch message in step 108, and, if valid, stores the patch information in step 110. If the next patch message is not valid, the mobile unit sends an appropriate error message in step 106.

The mobile unit continues in this manner until all patch messages are received for the patch file. The mobile unit uses the "number of patches" defined by the new patch message to determine the total number of patch messages associated with a patch file. In one embodiment of the present invention, there is a new patch file message plus a number of append patch messages, the total equal to the "number of patches" field in the new patch file message format shown in FIG. 4. The number of append data messages can be determined from respective "number of bytes of data" fields in the new patch file message or the append patch messages.

As described above, each patch message is a discrete message. When the mobile unit identifies an incoming message as a patch message, the mobile unit handles the patch message accordingly. The patch messages can be transmitted over a long or short period of time, and in one or many separate communication sessions. The mobile unit waits until a complete set of patch messages has been received and then continues to step 116 of FIG. 5. Alternatively, the mobile unit may begin to create the patched operating code while still receiving additional patch messages from manager host 16.

In step 116, the mobile unit creates patched operating code. To do so, the mobile unit merges the patch or patches defined by the set of patch messages into the current operating code to create a patched operating code. One embodiment of this process is described with respect to FIG. 6. This process is not necessary if the mobile unit receives a set of download messages that in themselves define the new operating code to be executed.

After creating the patched operating code, the mobile unit verifies the patched operating code in step 118. This step can be performed using a checksum or other appropriate technique. In step 120, the mobile unit determines whether the result of verification indicates valid patched operating code. If not, the mobile unit transmits an appropriate error message in step 106. The mobile unit may then receive a delete unincorporated patch messages from manager host 16, and the process can be repeated at step 100.

If the patched operating code is valid, the mobile unit resets and restarts such that execution is switched to the patched operating code in step 122. One embodiment of this reset and restart process is described with respect to FIG. 7. After patching is completed, the mobile unit executes and operates according to the patched operating code. If a new set of patch messages is received, the mobile unit repeats the patching process to create and switch to new patched operating code. In this manner, the current operating code in the mobile unit may be remotely patched to provide enhancements or corrections as part of ongoing support of the mobile unit. Similarly, a set of download messages can provide an entirely new version of software to replace the current version.

Figure 6:
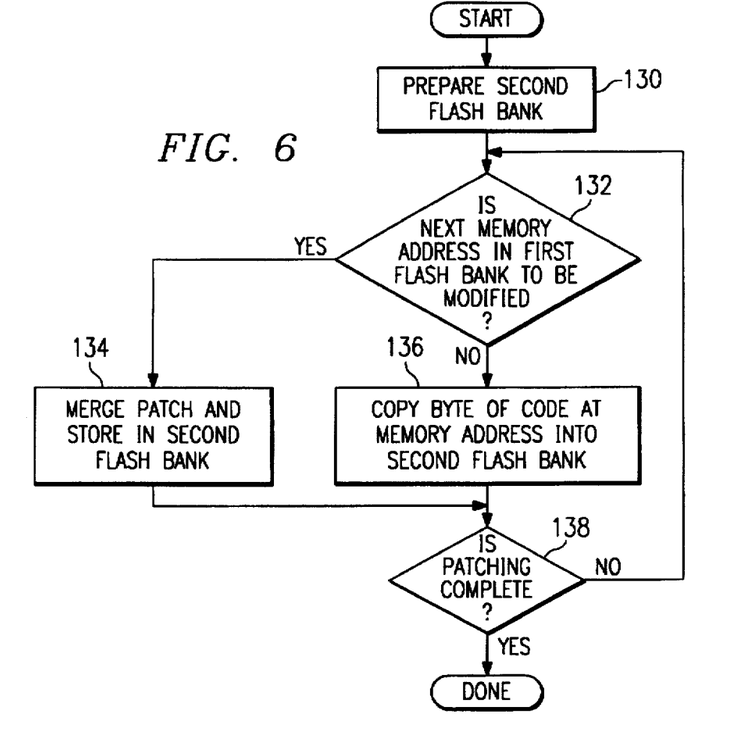
FIG. 6 is a flow chart showing one embodiment of a method of creating patched operating code in a mobile unit.

FIG. 6 is a flow chart showing one embodiment of a method of creating patched operating code. In this embodiment, the mobile unit comprises first flash bank 66 and second flash bank 68 and can execute operating code located in either flash memory bank. The mobile unit also comprises RAM 70 holding the patch information supplied by the set of patch messages.

In step 130, the mobile unit prepares the second flash bank 68 to receive patched code. Second flash bank 68 is the one in which the current operating code is not located. In step 132, the mobile unit begins the process of merging patches into the current operating code. In step 132, the mobile unit determines whether the next memory address of the current operating code in the first flash bank is to be modified by a patch beginning with the first memory address that holds part of the current operating code. If so, in step 134, the mobile unit merges the patch with the current operating code and stores the resulting patched operating code in the second flash bank 68. In one embodiment of the present invention, the mobile unit steps through byte-by-byte, and upon detecting a patch, inserts bytes of a patch. After inserting bytes of a patch, the mobile unit continues with the next byte in the current operating code. If the next memory address in the first flash bank 66 is not to be modified, the mobile unit copies the associated byte of operating code into the second flash bank 68 in step 136.

In step 138, the mobile unit determines whether patching is complete. If not, the mobile unit continues at step 132. This process proceeds byte-by-byte, sequentially, until a current operating code memory address matches a patch message "memory address to be modified" field. The mobile unit continues merging patches with the current operating code until the current operating code has been processed completely from beginning to end and all patches have been inserted. In this manner, patched operating code is created in the second flash bank 68 by merging the current operating code in first flash bank 66 with the patches defined by the set of patch messages. The second flash bank 68 then contains complete patched operating code that is ready for verification and execution by the mobile unit.

Figure 7:
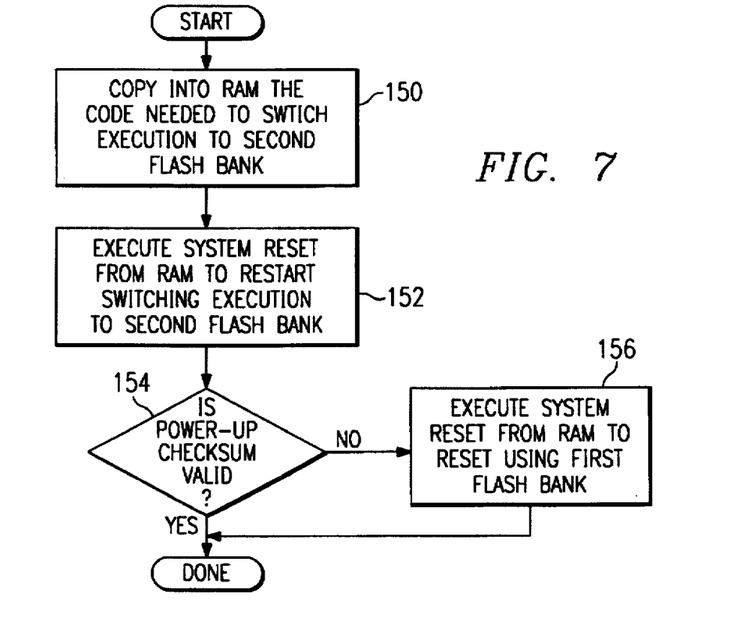
FIG. 7 is a flow chart showing one embodiment of a method of resetting and restarting with patched operating code.

FIG. 7 is a flow chart showing one embodiment of a method of resetting and restarting with patched or new operating code stored in second flash bank 68. This process operates to switch execution to either patched operating code generated from a set of patch messages or new operating code generated from a set of download messages. The embodiment described with reference to FIG. 7 comprises switching execution from first flash bank 66 which holds the current operating code to second flash bank 68 which holds the patched or new operating code. An analogous method could be used to switch from second flash bank 68 to first flash bank 66.

In step 150, the mobile unit copies into RAM 70 the code needed to switch execution to second flash bank 68. In this embodiment of the present invention, this code comprises a copy of boot code executed by the mobile unit when a reset occurs. The boot code includes instructions to cause execution of the patched or new operating code stored in second flash bank 68. In step 152, the mobile unit executes a system reset from RAM to restart and switch execution to second flash bank 68. In this embodiment, the mobile unit accomplishes the switch by setting a flag in RAM indicating that the mobile unit should execute operating code located in second flash bank 68. After the reset occurs, the mobile unit begins power-up with the patched or new operating code. Alternatively, the mobile unit may physically swap the contents of first memory bank 66 and second memory bank 68, perform a reset, and execute the new or patched operating code now residing in first memory bank 66.

In step 154, the mobile unit determines whether the power-up checksum is valid. If the power-up checksum is valid, then the patched or new operating code located in the second flash bank 68 is valid, and the mobile unit continues execution of the patched or new operating code. If the power-up checksum is not valid, then in step 156, the mobile unit executes another system reset from RAM to restart and switch execution back to first flash bank 66. Thus, if the patched or new operating code is not valid, the mobile unit returns to executing the current operating code as it existed prior to receiving a set of patch messages or download messages.

In an alternative embodiment, the mobile unit copies the contents of second flash bank 68 to first flash bank 66 after verifying the receipt and compilation of patched or new operating code. Mobile unit then executes the patched or new operating code residing in first flash bank 66. If the operating code in first flash bank 66 becomes corrupted, then mobile unit can switch execution to the copy of the same operating code stored in second flash bank 68.

The system and method of remote patching or updating of operating code located in a mobile unit of the present invention provides numerous technical advantages. A manager host can provide support for operating code located in one or more mobile units. The manager host can transmit a set of discrete patch messages collectively representing a patch file defining one or more patches to be made to operating code currently executed by one or more mobile units. The patches can comprise enhancements or corrections to the current operating code. The mobile units are capable of receiving the patch messages, creating patched operating code, and switching execution to the patched operating code without interrupting normal functions. The manager host can also transmit a set of discrete download messages collectively representing new operating code to replace the current operating code being executed by the mobile unit.

Although the present invention has been described with respect to several embodiments, it should be understood that various changes, substitutions and alterations can be made thereto without departing from the spirit and scope of the invention as defined by the appended claims.

What is claimed is:

1. A system for remote patching of operating code located in a mobile unit, comprising:

a manager host operable to initiate transmission through a wireless communication network of at least one discrete patch message defining at least one patch;

a first mobile unit operable to receive the at least one discrete patch message, the first mobile unit further operable to create patched operating code by merging the at least one patch with current operating code located in the first mobile unit and to switch execution to the patched operating code; and a second mobile unit operable to receive the at least one discrete patch message, the second mobile unit further operable to create patched operating code by merging the at least one patch with current operating code located in the second mobile unit and to switch execution to the patched operating code; and wherein the manager host is further operable to address the at least one discrete patch message such that the at least one discrete patch message is transmitted to the first mobile unit but not to the second mobile unit.

2. The system of claim 1, wherein the current operating code and the patched operating code comprise object code for a processor located in the first mobile unit.

3. The system of claim 1, wherein the at least one discrete patch message collectively represent a patch file that defines the at least one patch.

4. The system of claim 1, wherein the at least one discrete patch message comprises one discrete patch message.

5. The system of claim 4, wherein the one discrete patch message defines one patch to be made to the current operating code.

6. The system of claim 1, wherein the at least one discrete patch message comprises a plurality of discrete patch messages.

7. The system of claim 6, wherein the at least one discrete patch message defines a plurality of patches to be made to the current operating code.

8. The system of claim 7, wherein the at least one discrete patch message includes at least one new patch file message and at least one append patch message.

9. The system of claim 8, wherein the at least one discrete patch message further includes at least one append data message.

10. The system of claim 1, wherein the mobile unit separately verifies the at least one discrete patch message.

11. The system of claim 1, wherein the mobile unit separately verifies the at least one discrete patch message, and the mobile unit verifies the patched operating code.

12. The system of claim 1, wherein the manager host is further operable to address another discrete patch message such that the other discrete patch message is transmitted to the second mobile unit but not to the first mobile unit.

13. The system of claim 1, wherein the first mobile unit is associated with a first client host, and the second mobile unit is associated with a second client host.

14. The system of claim 1, wherein the manager host is further operable to address the at least one discrete patch message such that the at least one discrete patch message is transmitted to the first mobile unit and to the second mobile unit.

15. The system of claim 14, wherein the first mobile unit is associated with a first client host, and the second mobile unit is associated with a second client host.

16. The system of claim 1, wherein the wireless communication network includes an enhanced services complex operable to establish communication with the first mobile unit and to transmit the at least one patch message to the first mobile unit.

17. A mobile unit, comprising:

a memory operable to store current operating code;

a receiver operable to receive the at least one discrete patch message transmitted through a wireless communication network, the at least one discrete patch message defining at least one patch to be made to the current operating code;

a processor coupled to the memory and to the receiver, the processor operable to execute the current operating code, to process the at least one discrete patch message, to create patched operating code by merging the at least one patch with the current operating code, and to switch execution to the patched operating code;

a second memory coupled to the processor; and a third memory coupled to the processor;

and wherein the processor is further operable to store patch information provided by the at least one discrete patch message in the second memory and to store the patched operating code in the third memory after the patched operating code is created.

18. The system of claim 17, wherein the current operating code and the patched operating code comprise object code for the processor.

19. The system of claim 17, wherein the processor is further operable to switch execution between the first memory and the third memory.

20. The system of claim 19, wherein the processor is further operable to switch execution between the first memory and the third memory after a system reset.

21. The system of claim 17, wherein the first memory comprises a first flash bank, the second memory comprises a random-access memory, and the third memory comprises a second flash bank.

22. A mobile unit, comprising:
a first memory operable to store current operating code;
a receiver operable to receive the at least one discrete patch message transmitted through a wireless communication network, the at least one discrete patch message defining at least one patch to be made to the current operating code;
a processor coupled to the first memory and to the receiver, the processor operable to execute the current operating code, to process the at least one discrete patch message, to create patched operating code by merging the at least one patch with the current operating code, and to switch execution to the patched operating code; and
a second memory coupled to the processor; and
wherein the processor is further operable to store patch information provided by the at least one discrete patch message in the second memory.

23. The system of claim 22, further comprising:
a third memory coupled to the processor; and
wherein the processor is further operable to store the patched operating code in the third memory after the patched operating code is created.

24. A set of discrete patch messages for defining a plurality of patches to be made to current operating code located in a mobile unit, comprising:
a new patch file message operable to define a first patch to be made to current operating code;
an append patch message operable to define an additional patch to be made to the current operating code; and
an append data message operable to extend patch definition information; and
wherein the new patch file message comprises information including a patch file ID, a software version, a number of patches, and first patch data.

25. The set of patch messages of claim 24, wherein the new patch file message further comprises message type, memory address to be modified by patch, starting address in patch memory space, and number of bytes of data.

26. The set of patch messages of claim 24, wherein the append patch message comprises information including a patch file ID, and additional patch data.

27. The set of patch messages of claim 26, wherein the append data message comprises information including a patch file ID, and patch extension data.

28. A method of operation of a mobile unit for remote patching of operating code, comprising:
receiving at least one discrete patch message defining at least one patch to be made to current operating code located in the mobile unit;
creating patched operating code by merging the at least one patch with the current operating code to create the patched operating code; and
switching execution to the patched operating code, wherein switching execution comprises:
copying boot code into a first memory;
execution a system reset from the first memory such that execution is switched from a second memory to a third memory; and
restarting using patched operating code in the third memory.

29. The method of claim 28, wherein the step of creating comprises creating patched operating code comprising object code for a processor located in the mobile unit.

30. The method of claim 28, further comprising the step of verifying each patch message after the step of receiving.

31. The method of claim 28, further comprising the step of verifying the patched operating code after the step of creating.

32. The method of claim 28, wherein the step of creating patched operating code comprises the steps of:
processing the current operating code byte-by-byte to determine whether a patch is to be made to each byte of the current operating code; and
storing the patched operating code in a memory byte-by-byte as the current operating code is processed.

33. The method of claim 28, further comprising the step of validating patched operating code executed from the third memory.

34. A method of operation of a mobile unit for remote patching of operating code, comprising:
receiving at least one discrete patch message defining at least one patch to be made to current operating code located in the mobile unit;
creating patched operating code by merging the at least one patch with the current operating code to create the patched operating code;
verifying the patched operating code after the step of creating; and
swtitching execution to the patched operating code.

35. A method for remote patching of operating code located in a mobile unit, comprising:
transmitting at least one discrete patch message defining at least one patch through a communication network;
receiving the at least one patch message in a first mobile unit, the first mobile unit executing current operating code located in the first mobile unit;
creating patched operating code in the first mobile unit by merging the at least one patch with the current operating code;
switching execution in the first mobile unit to the patched operating code; and
wherein the step of transmitting further comprises addressing the at least one discrete patch message such that the at least one discrete patch message is transmitted to the first mobile unit but not to a second mobile unit.

36. The method of claim 35, wherein the step of creating comprises creating patched operating code comprising object code for a processor located in the first mobile unit.

37. The method of claim 35, wherein the step of receiving comprises separately verifying the at least one discrete patch message.

38. The method of claim 37, wherein the step of switching comprises verifying the patched operating code.

39. The method of claim 35, wherein the step of transmitting is accomplished using an enhanced services complex in a communication network.

40. The method of claim 35, wherein the step of transmitting further comprises addressing another discrete patch message such that the other discrete patch message is transmitted to a second mobile unit but not to the first mobile unit.

41. The method of claim 35, wherein the first mobile unit is associated with a first client host, and the second mobile unit is associated with a second client host.

42. The method of claim 35, wherein the first mobile unit and the second mobile unit are associated with a first client host.

* * * * *

UNITED STATES PATENT AND TRADEMARK OFFICE
CERTIFICATE OF CORRECTION

PATENT NO. : 5,699,275
DATED : December 16, 1997
INVENTOR(S) : Beasley, *et al.*

It is certified that error appears in the above-identified patent and that said Letters Patent is hereby corrected as shown below:

Column 5, line 41, after "message.", delete "application", and insert
-- Application --.

Column 5, line 47, after "in", delete "application" and insert
-- Application --.

Column 15, line 13, delete "execution" and insert -- executing --.

Signed and Sealed this

Twelfth Day of May, 1998

*Attest:*

BRUCE LEHMAN

*Attesting Officer*     Commissioner of Patents and Trademarks

UNITED STATES PATENT AND TRADEMARK OFFICE
CERTIFICATE OF CORRECTION

PATENT NO. : 5,699,275
DATED : December 16, 1997
INVENTOR(S) : Beasley, *et al.*

It is certified that error appears in the above-identified patent and that said Letters Patent is hereby corrected as shown below:

Column 15, line 13, delete "executing", and insert -- execution --.

Column 15, line 58, delete "execution", and insert -- executing --.

Signed and Sealed this

Fourth Day of August, 1998

Attest:

Attesting Officer

BRUCE LEHMAN
Commissioner of Patents and Trademarks